United States Patent
Eydelberg (10) Patent No.: US 7,231,513 B1
(45) Date of Patent: Jun. 12, 2007

(54) DYNAMICALLY LINKED BASIC INPUT/OUTPUT SYSTEM

(75) Inventor: Alex I. Eydelberg, Daly City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/465,600

(22) Filed: Dec. 17, 1999

(51) Int. Cl.
H04L 9/32 (2006.01)

(52) U.S. Cl. .......................................... 713/2; 713/166

(58) Field of Classification Search ............... 709/106, 709/107, 200, 201, 220, 222, 223; 713/1–2, 713/161, 200–201, 100, 300, 152, 166; 711/105, 711/111, 5; 726/2–3, 14, 17–18, 21–28; 710/1, 10, 12, 28, 36
See application file for complete search history.

(56) References Cited

U.S. PATENT DOCUMENTS

| | | | | |
|---|---|---|---|---|
| 5,022,077 A | * | 6/1991 | Bealkowski et al. ......... | 711/163 |
| 5,483,649 A | * | 1/1996 | Kuznetsov et al. ............ | 726/22 |
| 5,892,906 A | * | 4/1999 | Chou et al. .................. | 713/202 |
| 5,978,912 A | * | 11/1999 | Rakavy et al. ................. | 713/2 |
| 5,995,624 A | * | 11/1999 | Fielder et al. ............... | 713/169 |
| 5,999,989 A | * | 12/1999 | Patel .............................. | 710/1 |
| 6,038,663 A | * | 3/2000 | Feldman .......................... | 713/1 |
| 6,161,177 A | * | 12/2000 | Anderson ....................... | 713/2 |
| 6,175,917 B1 | * | 1/2001 | Arrow et al. ................... | 713/1 |
| 6,202,091 B1 | * | 3/2001 | Godse ......................... | 709/222 |
| 6,226,762 B1 | * | 5/2001 | Foote et al. .................. | 714/48 |
| 6,272,629 B1 | * | 8/2001 | Stewart ......................... | 713/2 |
| 6,324,644 B1 | * | 11/2001 | Rakavy et al. ................. | 713/1 |
| 6,438,711 B2 | * | 8/2002 | Woodruff ...................... | 714/27 |
| 6,477,648 B1 | * | 11/2002 | Schell et al. ................. | 713/200 |
| 6,564,318 B1 | * | 5/2003 | Gharda et al. ................. | 713/2 |
| 6,658,562 B1 | * | 12/2003 | Bonomo et al. ............... | 713/1 |
| 6,718,464 B2 | * | 4/2004 | Cromer et al. ................. | 713/2 |
| 6,748,525 B1 | * | 6/2004 | Hubacher et al. .............. | 713/1 |
| 6,768,272 B2 | * | 7/2004 | Shwang-shi ................ | 315/224 |
| 6,892,323 B2 | * | 5/2005 | Lin .............................. | 714/36 |

OTHER PUBLICATIONS

Alex I. Eydelberg, U.S. Appl. No. 09/450,311, filed Nov. 29, 1999 entitled "Distributed, Conditionally Executed Basic Input/Output System".

* cited by examiner

Primary Examiner—Kambiz Zand
Assistant Examiner—Leynna T Ha
(74) Attorney, Agent, or Firm—Trop, Pruner & Hu, P.C.

(57) ABSTRACT

A basic input/output system may include two modules one of which may be dynamically linked to the other. A first BIOS module may dynamically link to a second BIOS module. The BIOS modules may be stored in the same or different memories. One BIOS module may be executed conditionally. A function in a BIOS module may be dynamically linked through a header entry point.

29 Claims, 6 Drawing Sheets

DYNAMICALLY LINKED BASIC INPUT/OUTPUT SYSTEM

BACKGROUND

This invention relates generally to processor-based systems and particularly to basic input/output systems.

A basic input/output system (BIOS) is a set of software routines that test hardware at start up, start the operating system and support the transfer of data among hardware devices. Conventionally, BIOS is stored in a read only memory (ROM) so that it can be executed when a processor-based system is turned on.

BIOS is conventionally monolithic, in that the files making up the BIOS are not separately accessible. The BIOS is generally loaded as a whole and executed as a whole. This simplifies the operation of the BIOS and may, in some cases, when relatively simple processor-based systems are involved, speed the execution of the BIOS and improve the speed at which a system boots up.

However, with the advent of increasingly more complex functions implemented by increasingly lower cost systems, the demands on BIOS have increased. The proliferation of a variety of different types of BIOS and a variety of processor-based systems from very simple systems to extremely complex multiprocessor systems, have increased the demands on the BIOS.

Thus, there is a need for a BIOS which is capable of implementing more elaborate capabilities.

SUMMARY

In accordance with one aspect, a method includes executing a first basic input/output system module. The method also includes dynamically linking to a second basic input/output system module.

Other aspects are set forth in the accompanying detailed description and claims.

DETAILED DESCRIPTION

Figure 1:
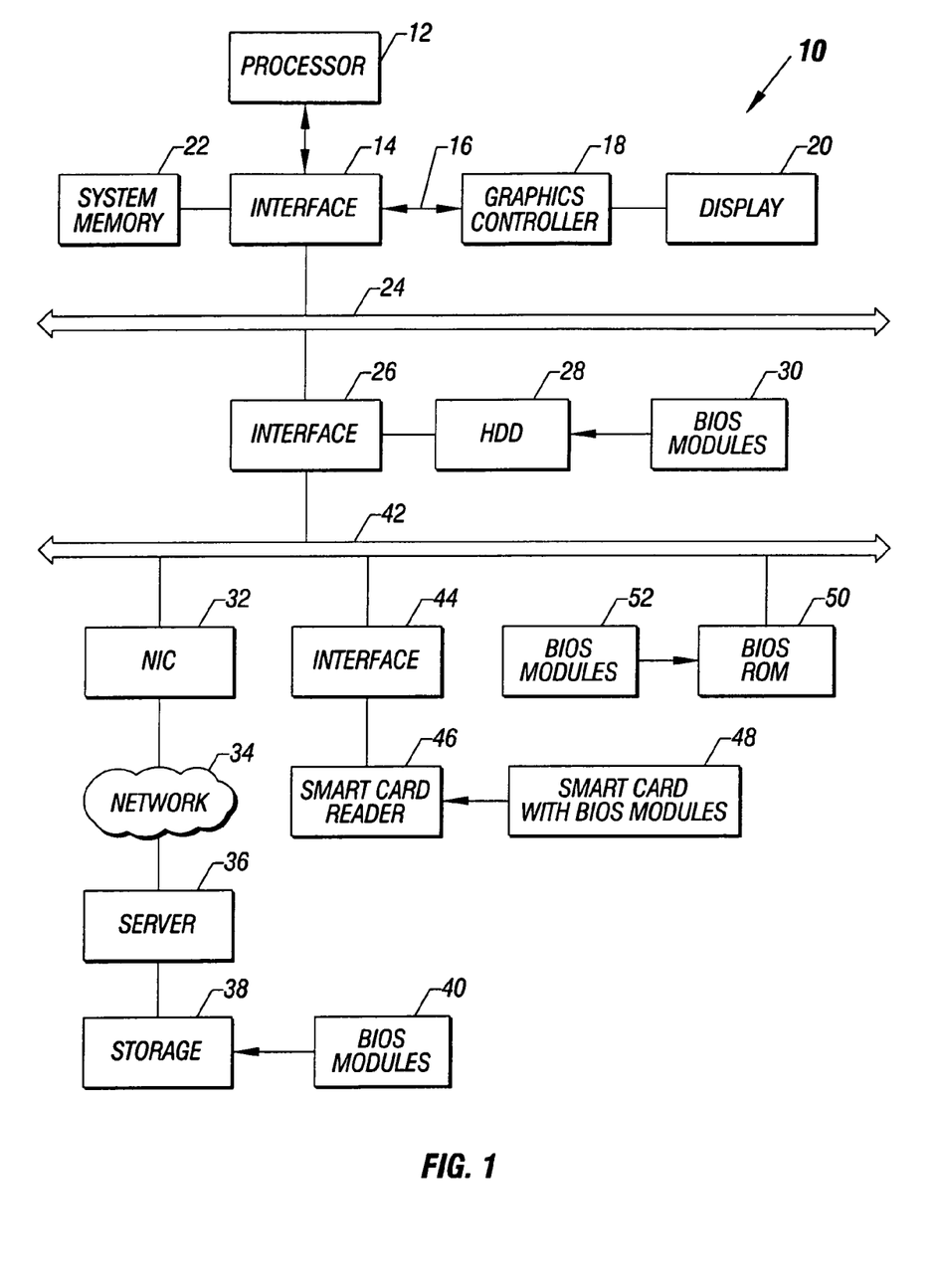
FIG. 1 is a block depiction of a processor-based system in accordance with one embodiment of the present invention.

Referring to FIG. 1, a processor-based system 10 may include a processor 12 coupled to an interface 14. The interface 14 may a bridge or a part of a chipset, as examples. The interface 14 may be coupled to a graphics controller 18, for example, by an accelerated graphics port (AGP) bus 16. (See Accelerated Graphics Port Interface Specification, Rev. 1.0, published Jul. 31, 1996 by Intel Corporation, Santa Clara, Calif.) The controller 18 may control a display 20. The interface 14 may also be coupled to the system memory 22.

The interface 14 may also be coupled to a bus 24. In one embodiment of the present invention, the bus 24 is a Peripheral Component Interconnect (PCI) bus which is compliant with the PCI Local Bus Specification, Rev. 2.1, Jun. 1, 1995 available from the PCI Special Interest Group, Portland, Oreg. 97214.

The bus 24 may be coupled to an interface 26 which may also be part of a chipset and which may be implemented by a bridge as examples. A legacy bus 42 may be coupled to the interface 26. Also coupled to the interface 26 is a hard disk drive 28 which may store basic input/output system (BIOS) module 30. A module is a file that need not meet any of the requirements normally associated with a Disk Operating System (DOS) file.

Also coupled to the legacy bus 42 is a network interface (NIC) card 32 that allows the system 10 to connect to a server 36 over a network 34. For example, in one embodiment of the present invention, the connection to the network and the assignment of Internet Protocol (IP) addresses may be handled using Dynamic Host Configuration Protocol (see Request for Comments (RFCs) 1534, 2131 and 2132 available at www.ietf.org) (DHCP). The server 36 may include a storage device 38 which also stores BIOS module 40.

Also coupled to the legacy bus 42 is a BIOS read only memory (ROM) 50 that may store additional BIOS module 52. In some embodiments of the present invention, additional BIOS file storage devices may be coupled to the bus 42 through the interface 44. For example, a smart card reader 46 may be coupled to the bus 42. The smart card reader may read a smart card which stores a BIOS module, as indicated at 48. A more detailed description of the operation of smart cards and smart card readers, also known as integrated circuit cards (ICCs) and interface devices (IFDs) is set forth in the Interoperability Specification for ICCs and Personal Computer Systems Developed by the PC/SC Work Group, Rev. 1.0, published in December 1997.

Figure 2:
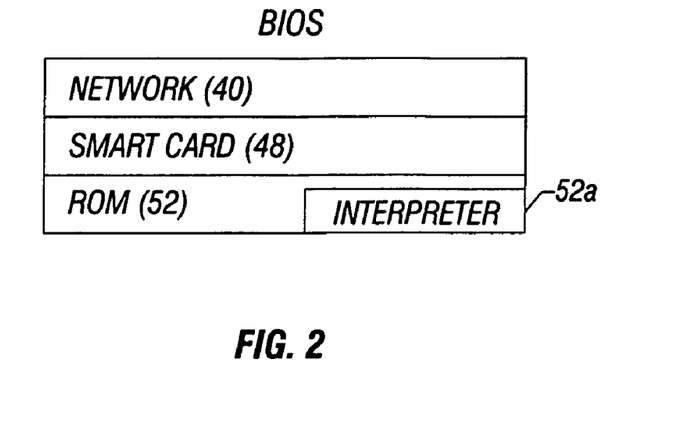
FIG. 2 is a BIOS map for a distributed BIOS system in accordance with one embodiment of the present invention.

The BIOS, which normally would be stored before execution entirely on the BIOS ROM 50, may be distributed among a plurality of modules stored in a plurality of storage devices. Referring for example to FIG. 2, the unexecuted BIOS may be made up of BIOS module 52 stored in the ROM 50, BIOS module 40 stored in the storage 38 associated with the server 36 and BIOS module contained on a smart card 48 read by a card reader 46. Not only may the BIOS be stored in devices accessible over the legacy bus 42, BIOS modules may also be stored on devices accessible through the bus 24 as well.

While an illustrated embodiment discloses a system in which a distributed BIOS is utilized (BIOS modules are distributed among a variety of different memory types and locations), in some embodiments of the present invention, all of the BIOS modules may be stored on the same memory. For example, any one of the BIOS storing memories illustrated in FIG. 1 may store all of the BIOS modules. For example, in one embodiment of the present invention, the BIOS ROM 50 may store all the BIOS modules prior to execution.

The control of the various modules may be undertaken by an interpreter 52a which, in one embodiment of the present invention, may be stored on the BIOS ROM 50. The interpreter 52a contains all the directions to the various BIOS modules. It reads the various instructions and provides instructions about what to do under various circumstances. Thus, the interpreter 52a may be responsible for conditionally integrating the BIOS functions into an overall BIOS operation.

One example of an application of such a distributed BIOS system involves preboot authentication services (PAS). It should be understood however, that the application of distributed BIOS to PAS is merely an example of one application which may be implemented using a distributed BIOS system and is not intended to be limiting in any way.

PAS provides different levels of authentication depending on the status of the processor-based system. For example, if the processor-based system 10 is connected to the network 34, the possibility of compromising system resources is much higher than if the system 10 were operated on a stand-alone basis without connection to network 34 resources. Therefore, in order to provide protection for those network resources, the authentication protocols for a new user may be implemented variably depending on the system state—in this case whether or not the system 10 is connected to a network 34.

With PAS, some parts of BIOS are optional, not only in terms that they need not be executed but also because they may not exist at all or they may exist conditionally depending on a system state. In one example, the system state may be whether or not the system is connected to a network. Authentication requirements may be lowered when there is no desire to link to the network.

In PAS, when the system 10 is linked to the network 34, for example through a local adapter or NIC 32, this connection may be recognized, and the BIOS may control the nature of the authentication. This detection of a network connection may be provided through the NIC 32 or, for example in the case of mobile systems, when the mobile system is docked to a docking bay.

Once network resources may be accessed, the authentication requirements may be increased. For example, there may be a token file which is also part of BIOS which may be placed on a network storage 38 such as a network drive rather than on the local system storage such as the BIOS ROM 50. The BIOS module 40 may be requested by the local system 10, loaded and executed for use in authentication. Similarly, the system 10 may require the use of smart card authentication in one embodiment of the invention. Again, the PAS system may provide different levels of authentication that may specify, not only the entry of conventional tokens such as passwords, but also the use of a smart card, depending on whether or not the system 10 is connected to the network 34.

In one embodiment of the present invention, the BIOS module 40 may constitute a network bootstrap program (NBP). NBPs are remote boot images which may be downloaded by a client by way of trivial file transfer protocol (TFTP). TFTP is an industry standard Internet protocol to enable the transmission of files across the Internet. (See RFC 1350, available at www.ietf.com.) Other file transfer protocols may be utilized as well. The operation of a system which uses TFTP and NBPs is described in the Preboot Execution Environment (PXE) Specification, Version 2.1, dated Sep. 20, 1999 by Intel Corporation, Santa Clara, Calif. (available at www.intel.com).

PXE allows for remote new system startup. PXE provides a uniform protocol for the client to request the allocation of a network address and subsequently address the download of an NBP from a network boot server. It also provides a set of application program interfaces (APIs) available on the client's preboot firmware environment that constitute a set of services that can be employed by the NBP or the BIOS. Finally, PXE provides a standard method of initiating the preboot firmware to execute the PXE protocol on the client. A newly installed network client may enter a heterogeneous network, acquire a network address from a DHCP server and then download an NBP to set itself up. Thus, with PXE, a client such as the system 10 may be connected to a network in an automatic fashion, in the boot sequence, enabling the acquisition of a BIOS module from a remote network 34 during the boot process.

Figure 3:
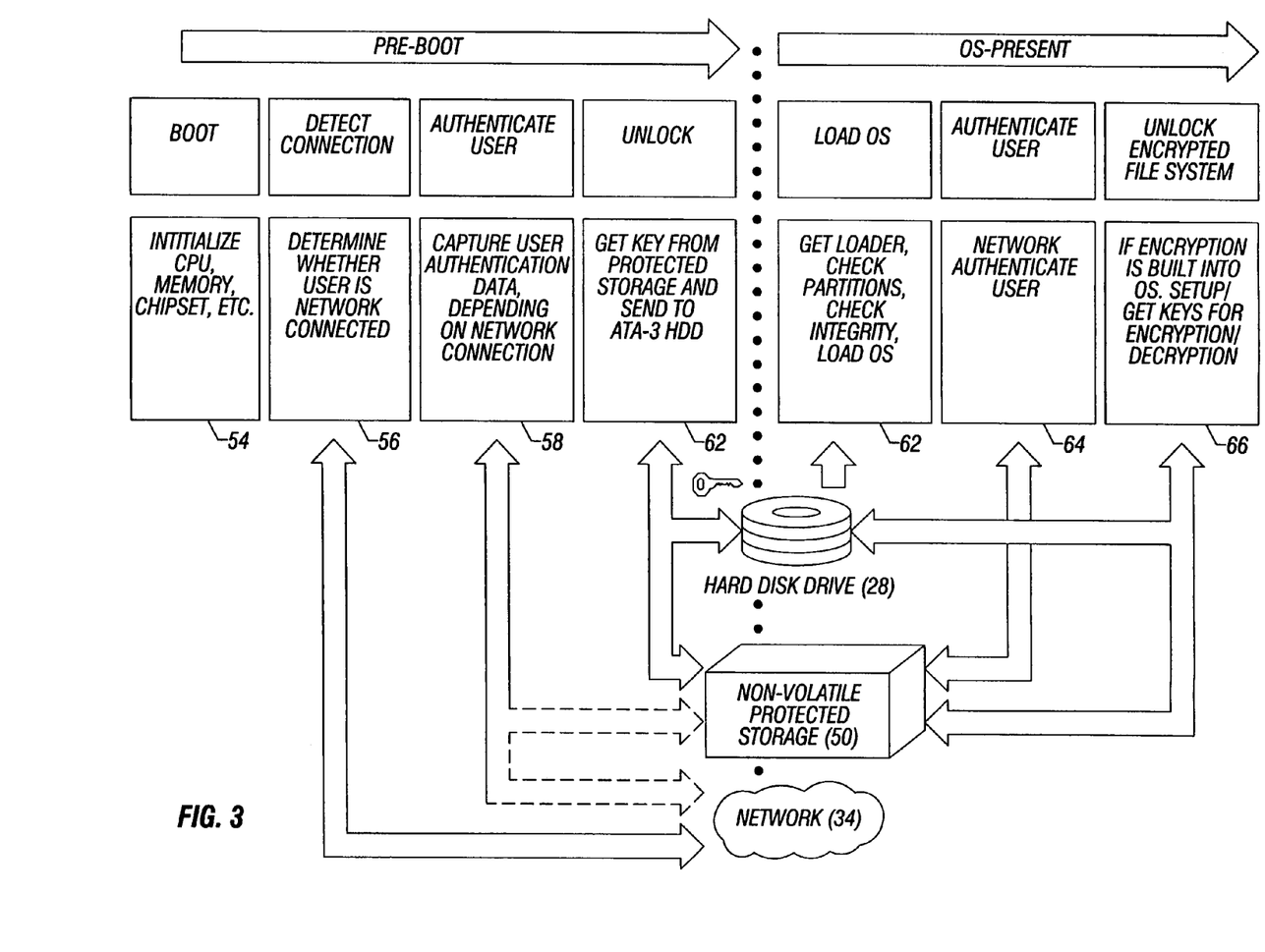
FIG. 3 is a schematic depiction of a preboot authentication system in accordance with one embodiment of the present invention.

Turning now to FIG. 3, the BIOS may begin with the initialization of the processor 12, the memory, any chipsets and the like as indicated in block 54. This is the beginning of the boot process. Next, a connection to a network 34 may be detected as indicated in block 56. The detection of the network may be done through the PXE protocol. Since PXE is used to connect to the network during post and the pre-operating system space, an integrated NIC may be polled to determine whether a network connection has been automatically set up through the PXE protocol. An PXE API may be provided that polls the PXE related files to determine the network status.

Next, as shown in block 58, the user authentication data may be captured and stored. Of course, the nature of the user authentication data may differ depending on whether the system is connected to a network. Thus, authentication data may come over the network 34 or from the storage 50 depending on the state of the system 10.

After the user has been authenticated, a key may be obtained from protected storage. The key may be sent over a hard disk drive 28, in accordance with one embodiment of the present invention.

The OS is loaded, partitions are checked, and integrity is determined as indicated in block 62. In the post-operating system or post-OS space, the user may again be authenticated using operating system protocols as indicated in block 64. If encryption is built into the operating system, setup keys for encryption and decryption may be implemented in some embodiments as indicated in block 66.

Figure 4:
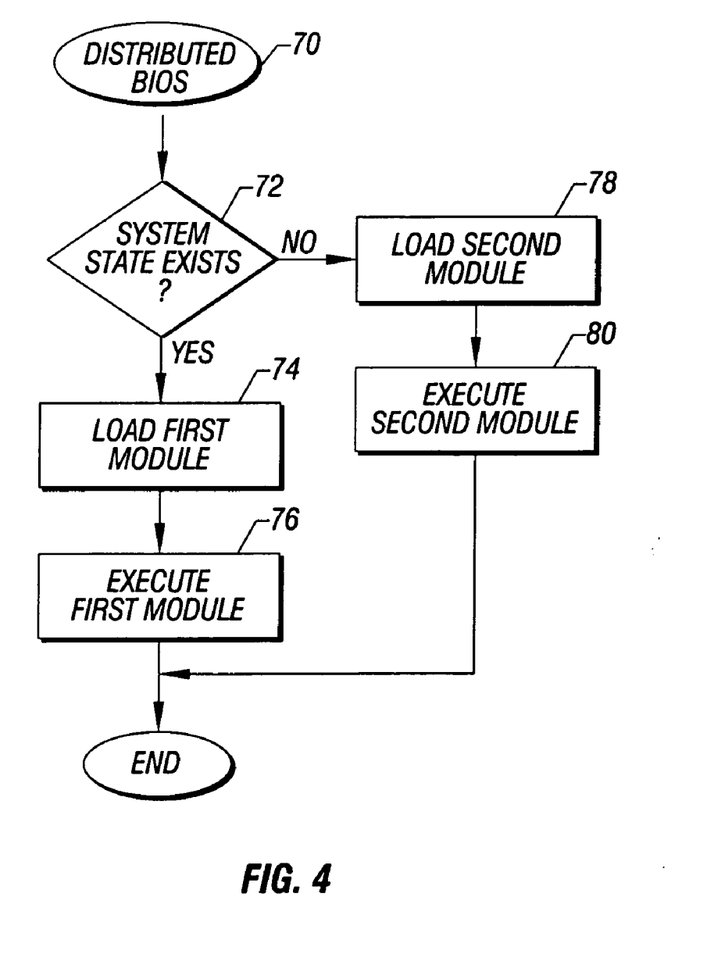
FIG. 4 is a flow chart for implementing one embodiment of the present invention.

Referring to FIG. 4, in accordance with one embodiment of the present invention, a distributed BIOS file system 52 may be executed by determining what system state exists as indicated in diamond 72. Again, this information may be obtained using the PXE protocol.

Depending on the system state (which in one embodiment of the present invention may be whether or not the system is connected to a network), a first BIOS module may be loaded as indicated in block 74 and executed as indicated in block 76. If a different system state exists, a second module may be loaded as indicated in block 78. Thereafter, this module may then be executed as indicated in block 80.

Thus, depending on the system state, either a first or a second module may be located and loaded. Those modules may or may not be distributed with respect to one another in that one of the modules, before execution, may be located in a storage different from the other of the modules. The modules may be loaded and executed under the direction of the interpreter 52a in one embodiment of the present invention.

Figure 5:
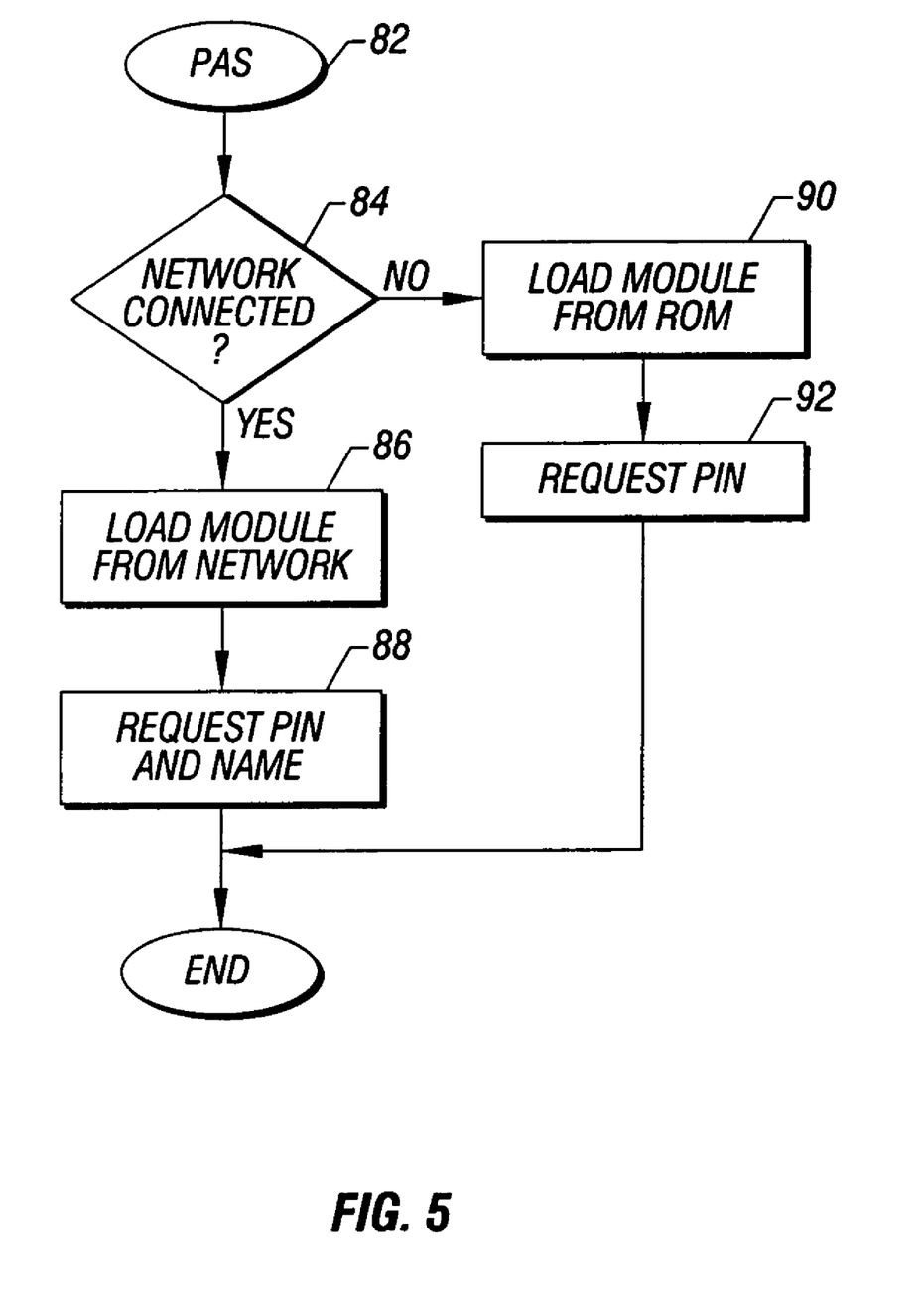
FIG. 5 is a flow chart for implementing another embodiment of the present invention.

Referring next to FIG. 5, the application of these principles in a PAS embodiment may begin by determining whether the system 10 is coupled to the network 34 as indicated in diamond 84. If so, the BIOS module 40 may be downloaded from storage 38 associated with the server 36 over the network 34. In this case, because the system is network connected, not only may a name be required, but a personal identification number (PIN) may also be required as well. Alternatively, other heightened security procedures may be invoked such as a requirement of the use of a smart card and smart card reader 48 and 46.

If the system is not network connected, a BIOS module may be loaded from the ROM 50. Since the system is not network connected, a more limited authentication protocol may be implemented, for example requesting only a PIN without a name as indicated in block 92.

In some embodiments of the present invention, the BIOS may be broken down on logically self-encapsulated modules. The execution and the presence of each module is optional. A particular module may be present (or not) depending on system state, and the needs of a particular system. Similarly, a particular module may be executed or it may be skipped depending on the system policy, user choice or what is actually present on a particular system.

For example, if a laptop computer is not connected to docking station and some BIOS modules are on the docking station, those files may not be available to be executed. For example, a docking station may contain a smart card reader which may be used for authentication when the computer is connected to the docking station. Thus, the system state may change what may be executed.

In some embodiments of the present invention, the distributed BIOS modules may be linked dynamically. A loader may be utilized to load the needed executable BIOS modules wherever located.

Figure 6:
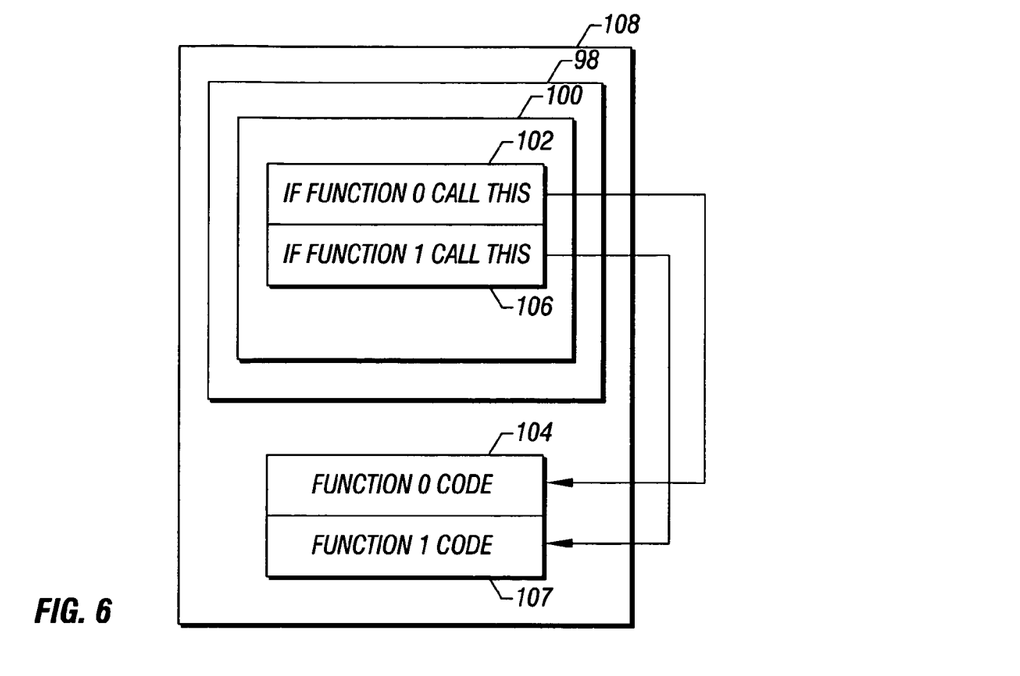
FIG. 6 is a schematic depiction of a module in accordance with one embodiment of the present invention.

Referring to FIG. 6, a given functional module 108 may have a predefined structure in accordance with one embodiment of the present invention. The module 108 may include a header 98 and the header 98 may include an entry point 100 which provides directions to locate one or more functions enabled by the module 108. Thus, the entry point 100 may include a direction 102 to code 104 for a first function implemented by a module and a direction 106 which directs the flow to a code 107 for a second function defined within the module 108. Thus, once the entry point 100 to the module 108 is located, its functions may be exposed.

The entry points for each module, as an offset from the module's base address, are generally stored in other modules. Thus, if a first module, that stores an offset to an entry point for a second module, finds the base memory address for the second module, the first module may link to the second module, in one embodiment of the present invention. A base memory address is defined by a shared descriptor table 100, shown in FIG. 7. The descriptor table 100 stores information 112 about the base address 114 for one or more modules 108. For example, the descriptor table 100 may provide information 112 sufficient to locate the base address 114 of one or more modules 108. Thus, the descriptor table 100 may have information 112a which locates the base address 114a of the module 108a.

Once the base address is located, the entry point can be determined from the offset. The offset provides the information about where the entry point is located in the module relative to the base address of the module. Once the entry point is determined, any function within the module may then be located.

Figure 7:
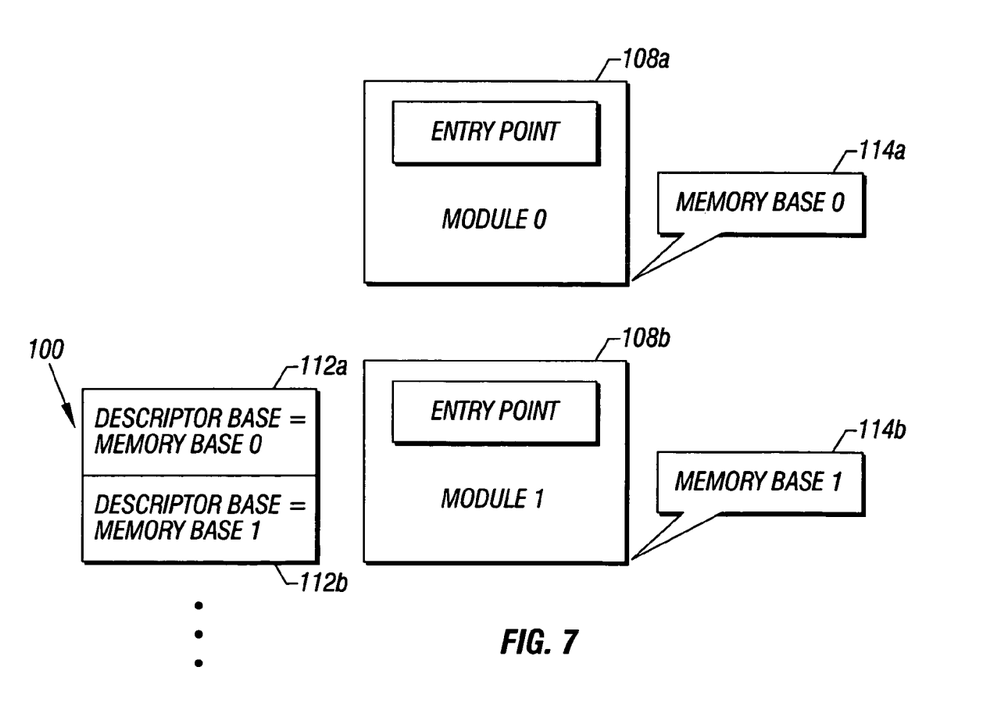
FIG. 7 is a schematic depiction of a descriptors table for accessing modules in accordance with one embodiment of the invention.

The memory base address 114 is a segment address which is defined at run time. More particularly, depending on where a particular module 108 ends up being stored, the base address is provided to the descriptor table 100. The table 100 may then be checked by any module attempting to link to another module to locate the base address of a particular module.

Thus, each module may export its entry point. It may do this by providing information about the structure of its header, naming conventions, length of the header, and check sums and finally an offset from a base address to the entry point within the header. At run time, the segment address where the module was stored (and in particular its base address) is known. The segment address points to the location of the base address. The segment address information 112 may then be stored in the descriptor table 100.

This allows the system processor to find appropriate free memory space to store the modules. An appropriate space is one which has sufficient size to store a given functional module 108 as expanded.

Figure 8:
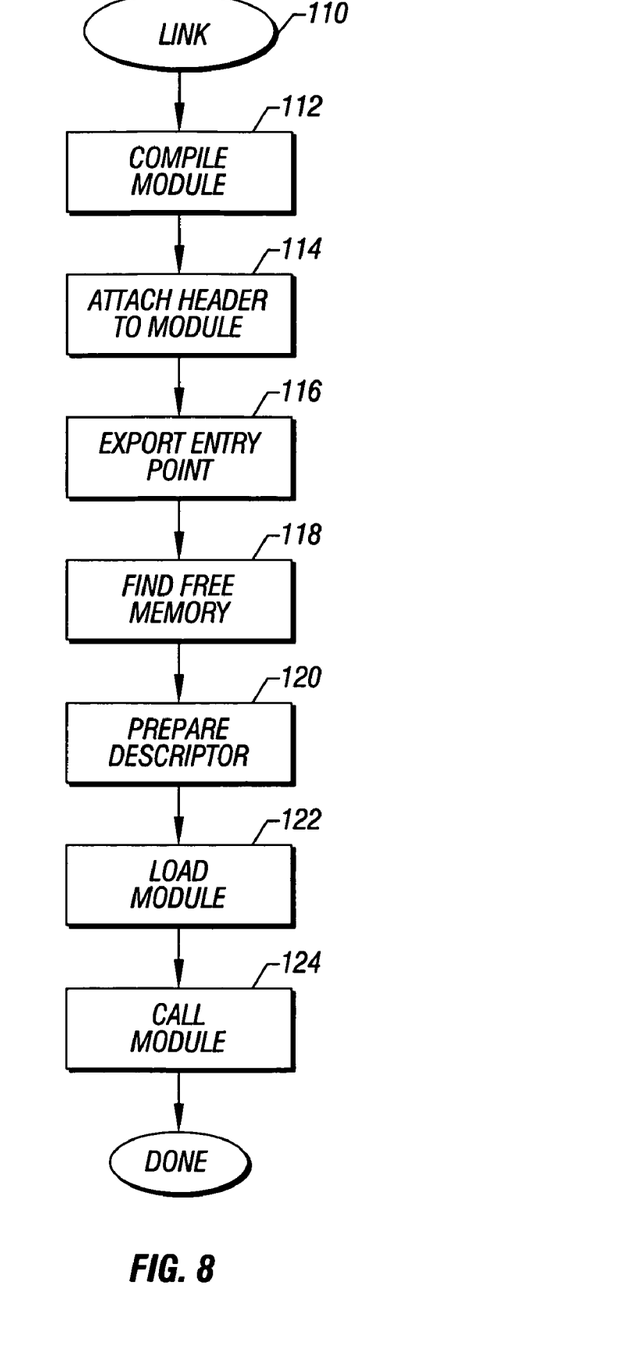
FIG. 8 is a flow chart for software for implementing dynamic linking of BIOS modules in accordance with one embodiment of the present invention.

Referring next to FIG. 8, the flow 110 for linking BIOS modules begins by compiling a BIOS module 108, as indicated in block 112. A header is then attached to the functional BIOS module as indicated in block 114. The header provides the function number that is used to locate particular functions implemented by the module. The entry point information is exported (block 116) from one module to other modules.

At run time, the system processor finds an appropriate free memory space to store each module, as indicated in block 118. An appropriate space is one which has sufficient size to store the given functional BIOS module as expanded. The information 112 to locate the base address of the module is prepared (block 120), as indicated in block 120, and the functional BIOS module 108 is loaded into the free memory space at the base address (block 122). Thereafter, the module may be called by another module as indicated in block 124.

A module is called by accessing its segment address from the descriptor table 100. This information, together with the entry point, produces the information needed to locate each function, by function numbers, supported by the called module.

In this way, one or more functional BIOS modules may be called by any other BIOS module to implement features which may or may not be desired in any particular system at any given time. For example, a PAS feature may or may not be utilized. A given module may be loaded and linked up depending on whether the system is network connected. For example, if the system is network connected, a functional BIOS module may be dynamically linked which provides enhanced authentication features.

As another example, a set-up feature may be selectively called up as a dynamically linked functional module in some cases. The set-up module may allow the user to input system set-up preferences such as power management, the source for booting (such as a floppy or hard disk drive), enabling specialized features such as hot docketing or any of a variety of configurational preferences. The set-up functional BIOS module may be called at run time depending on a system configuration or a user preference. It may be called by dynamically linking in the fashion described above.

As one additional example, the present invention may implement a so-called quiet boot feature. In quiet boot, the user elects not to see messages that come from BIOS during the boot process. These messages may be obscure (such as that the memory has been successfully initialized). Instead, the user may receive a bit mapped image on the screen during the boot process, replacing the BIOS messages. However, the bit map may use a lot of memory space. Thus, some users may want quiet boot and some may not.

In one embodiment of the present invention, after the user indicates whether or not the user wishes quiet boot in an original set up screen, the bit map files may be loaded only in those cases where the user actually has elected quiet boot and may not be loaded from a remote storage location in other cases. Thus, selected execution saves storage space except in those cases where the feature is actually utilized. This may be of considerable cost importance, since BIOS may be stored for example on flash memory and the flash memory may be used up by the bit mapped files.

Some embodiments of the present invention have the ability, at run time, to load a piece of code and execute it, and then thereafter to reuse the memory space previously used by that code, freeing up additional memory space occupied by such code for reuse. Moreover, BIOS modules may be loaded and executed on demand based on user preferences or conditionally based on system configuration, in some embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a system state indicative of whether a system is connected to a network;
   loading either a first module of a basic input/output system or a second module of the basic input/output system based on the system state;
   requesting a first level of authentication information or a second level of authentication information from a user based on the system state; and
   dynamically linking to one of a plurality of modules.

2. The method of claim 1, further comprising:
   storing said first module of the basic input/output system on a first storage device prior to execution;
   storing said second module of the basic input/output system on a second storage device prior to execution; and
   enabling said second module to be executed conditionally depending on the system state.

3. The method of claim 2, wherein storing said second module includes storing said second module in a storage associated with a network server accessible to said system over the network.

4. The method of claim 1, including detecting whether or not the system is connected to the network during a boot sequence.

5. The method of claim 1, including exporting an offset to an entry point in one module to another module.

6. The method of claim 5, including storing a secondary entry point in a module to locate a function within the module.

7. The method of claim 6, including developing a segment address for said second module at run time.

8. The method of claim 1, further comprising authenticating the user according to one of multiple levels based upon the system state, and obtaining a key from a protected storage if the user is authenticated.

9. The method of claim 1, wherein the first level of authentication information is greater than the second level of authentication information and further comprising requesting the first level of authentication information if the system is connected to the network.

10. The method of claim 1, further comprising executing the loaded one of the first basic input/output system module or the second basic input/output system module to request the authentication information from the user and authenticate the user.

11. The method of claim 10, further comprising authenticating the user a second time after an operating system is loaded.

12. The method of claim 1, wherein the first level of authentication information includes presence of a smart card in the system.

13. An article comprising a medium for storing instructions that cause a system to:
   determine a system state indicative of whether the system is connected to a network;
   load either a first module of a basic input/output system or a second module of the basic input/output system based on the system state;
   request a first level of authentication information or a second level of authentication information from a user based on the system state; and
   dynamically link to one of a plurality of modules.

14. The article of claim 13, further storing instructions that cause a system to:
   access said first module of the basic input/output system on a first storage device of the system;
   access said second module of the basic input/output system on a second storage device of the system; and
   execute said second module conditionally depending on the system state.

15. The article of claim 14, further storing instructions that cause a system to execute said second module conditionally depending on whether or not the system is coupled to the network.

16. The article of claim 14, further storing instructions that cause a system to selectively access either a first module setting forth a first authentication protocol in the first storage device or a second module setting forth a second authentication protocol in the second storage device based on the system state.

17. The article of claim 14, further storing instructions that cause a system to dynamically link to one of a plurality of modules using offsets to entry points in said modules.

18. The article of claim 17, further storing instructions that cause a system to store a secondary entry point in a module to locate a function within the module.

19. The article of claim 18, further storing instructions that cause a system to develop a segment address for said second module at run time.

20. The article of claim 13, further storing instructions that cause a system to obtain a key from a protected storage if a user is authenticated.

21. The article of claim 13, further storing instructions that cause a system to dynamically link said first and second modules.

22. The article of claim 13, further storing instructions that cause a system to detect whether the system is connected to the network during a boot sequence.

23. A system comprising:
   a first basic input/output system module stored in a first storage of the system, the first basic input/output system module executable by a processor; and
   a second basic input/output system module stored in a second storage of the system, the second basic input/output system module executable by said processor; and the processor to load either said first basic input/output system module or said second basic input/output system module based on a system state that indicates a connection to a network and to dynamically link to one of a plurality of modules.

24. The system of claim 23, further comprising a third basic input/output module stored in a third storage, said third storage being coupled to said system over the network.

25. The system of claim 24, further comprising a fourth basic input/output system module stored in a fourth storage.

26. The system of claim 25, further comprising a card reader coupled to the processor, the card reader to read a card, wherein the card comprises the fourth storage.

27. The system of claim 25, wherein the fourth storage comprises a smart card.

28. The system of claim 23, wherein said first and second basic input/output system modules include different authentication protocols.

29. The system of claim 28, wherein said processor to execute said second basic input/output system module to implement a network authentication protocol.

* * * * *